US006296380B1

(12) United States Patent
Dawli

(10) Patent No.: US 6,296,380 B1
(45) Date of Patent: Oct. 2, 2001

(54) LIGHTED STEERING WHEEL

(76) Inventor: Aboud Dawli, 583 Cross St., Washington Township, NJ (US) 07675

( * ) Notice: Subject to any disclaimer, the term of this patent is extended or adjusted under 35 U.S.C. 154(b) by 0 days.

(21) Appl. No.: 09/271,852

(22) Filed: Mar. 18, 1999

(51) Int. Cl.$^7$ ....................................................... B60Q 1/00
(52) U.S. Cl. ........................ 362/500; 362/224; 362/249; 362/253; 362/263; 362/488
(58) Field of Search .................................... 362/500, 503, 362/488, 49, 263, 249, 224, 253

(56) References Cited

U.S. PATENT DOCUMENTS

| 3,011,802 | * | 12/1961 | Ackerman | ................................ | 281/44 |
| 4,835,512 | * | 5/1989 | Bratton | ................................ | 340/457.2 |
| 5,823,666 | * | 10/1998 | Kingsolver | ................................ | 362/488 |
| 5,895,115 | * | 4/1999 | Pker et al. | ................................ | 362/511 |

* cited by examiner

*Primary Examiner*—Sandra O'Shea
*Assistant Examiner*—John Anthony Ward

(57) ABSTRACT

A lighted steering wheel for illuminating the steering wheel of a vehicle. The lighted steering wheel includes an outer ring defining a central space has a center. A hub for mounting to a steering column of a vehicle is located in the central space. A plurality of elongate spokes radially extend between the outer ring and the hub in the central space. The outer ring and the spokes comprise a translucent material for permitting the passage of light therethrough. An outer light source is provided in the outer ring. The outer light source has an elongate portion extending into a first of the spokes. A pair of elongate light sources. One of the elongate light sources is provided in a second of the spokes and another of the elongate light sources is provided in a third of the spokes. The outer light source and the elongate light sources are electrically connected together.

10 Claims, 2 Drawing Sheets

LIGHTED STEERING WHEEL

BACKGROUND OF THE INVENTION

1. Field of the Invention

The present invention relates to lighted steering wheels and more particularly pertains to a new lighted steering wheel for illuminating the steering wheel of a vehicle.

2. Description of the Prior Art

The use of lighted steering wheels is known in the prior art. More specifically, lighted steering wheels heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,008,782; U.S. Pat. No. 4,319,307; U.S. Pat. No. 4,547,655; U.S. Pat. No. Des. 103,962; U.S. Pat. No. 5,634,707; and U.S. Pat. No. 5,683,164.

While these devices fulfill their respective, particular objectives and requirements, the aforementioned patents do not disclose a new lighted steering wheel. The inventive device includes an outer ring defining a central space has a center. A hub for mounting to a steering column of a vehicle is located in the central space. A plurality of elongate spokes radially extend between the outer ring and the hub in the central space. The outer ring and the spokes comprise a translucent material for permitting the passage of light therethrough. An outer light source is provided in the outer ring. The outer light source has an elongate portion extending into a first of the spokes. A pair of elongate light sources. One of the elongate light sources is provided in a second of the spokes and another of the elongate light sources is provided in a third of the spokes. The outer light source and the elongate light sources are electrically connected together.

In these respects, the lighted steering wheel according to the present invention substantially departs from the conventional concepts and designs of the prior art, and in so doing provides an apparatus primarily developed for the purpose of illuminating the steering wheel of a vehicle.

SUMMARY OF THE INVENTION

In view of the foregoing disadvantages inherent in the known types of lighted steering wheels now present in the prior art, the present invention provides a new lighted steering wheel construction wherein the same can be utilized for illuminating the steering wheel of a vehicle.

The general purpose of the present invention, which will be described subsequently in greater detail, is to provide a new lighted steering wheel apparatus and method which has many of the advantages of the lighted steering wheels mentioned heretofore and many novel features that result in a new lighted steering wheel which is not anticipated, rendered obvious, suggested, or even implied by any of the prior art lighted steering wheels, either alone or in any combination thereof.

To attain this, the present invention generally comprises an outer ring defining a central space has a center. A hub for mounting to a steering column of a vehicle is located in the central space. A plurality of elongate spokes radially extend between the outer ring and the hub in the central space. The outer ring and the spokes comprise a translucent material for permitting the passage of light therethrough. An outer light source is provided in the outer ring. The outer light source has an elongate portion extending into a first of the spokes. A pair of elongate light sources. One of the elongate light sources is provided in a second of the spokes and another of the elongate light sources is provided in a third of the spokes. The outer light source and the elongate light sources are electrically connected together.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lighted steering wheel apparatus and method which has many of the advantages of the lighted steering wheels mentioned heretofore and many novel features that result in a new lighted steering wheel which is not anticipated, rendered obvious, suggested, or even implied by any of the prior art lighted steering wheels, either alone or in any combination thereof.

It is another object of the present invention to provide a new lighted steering wheel which may be easily and efficiently manufactured and marketed.

It is a further object of the present invention to provide a new lighted steering wheel which is of a durable and reliable construction.

An even further object of the present invention is to provide a new lighted steering wheel which is susceptible of a low cost of manufacture with regard to both materials and labor, and which accordingly is then susceptible of low prices of sale to the consuming public, thereby making such lighted steering wheel economically available to the buying public.

Still yet another object of the present invention is to provide a new lighted steering wheel which provides in the apparatuses and methods of the prior art some of the advantages thereof, while simultaneously overcoming some of the disadvantages normally associated therewith.

Still another object of the present invention is to provide a new lighted steering wheel for illuminating the steering wheel of a vehicle.

Yet another object of the present invention is to provide a new lighted steering wheel which includes an outer ring defining a central space has a center. A hub for mounting to a steering column of a vehicle is located in the central space. A plurality of elongate spokes radially extend between the outer ring and the hub in the central space. The outer ring and the spokes comprise a translucent material for permitting the passage of light therethrough. An outer light source is provided in the outer ring. The outer light source has an elongate portion extending into a first of the spokes. A pair of elongate light sources. One of the elongate light sources is provided in a second of the spokes and another of the elongate light sources is provided in a third of the spokes. The outer light source and the elongate light sources are electrically connected together.

Still yet another object of the present invention is to provide a new lighted steering wheel that illuminates the area around the steering wheel so that the driver can see the interior area at night.

Even still another object of the present invention is to provide a new lighted steering wheel that can be illuminated with different colored lights and with flashing lights and even strobe lights to provide an interesting feature to a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
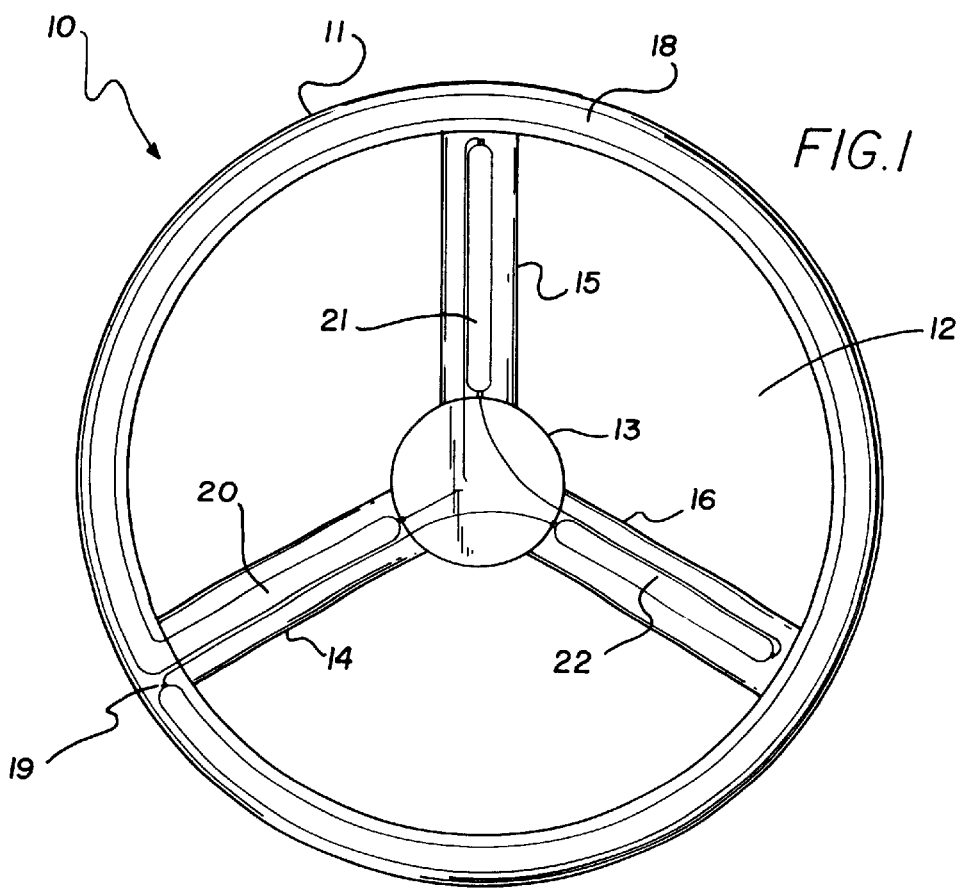
FIG. 1 is a schematic front view of a new lighted steering wheel according to the present invention.
Figure 2:
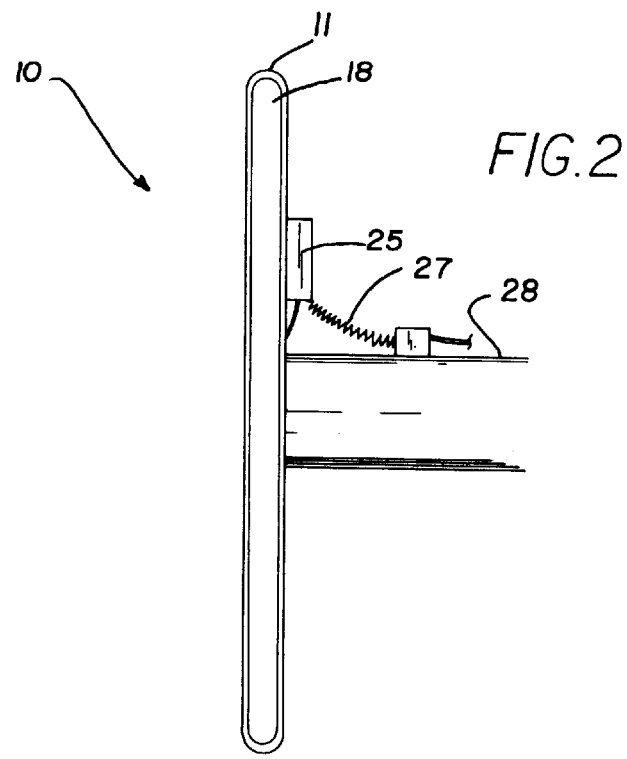
FIG. 2 is a schematic side view of the present invention.
Figure 3:
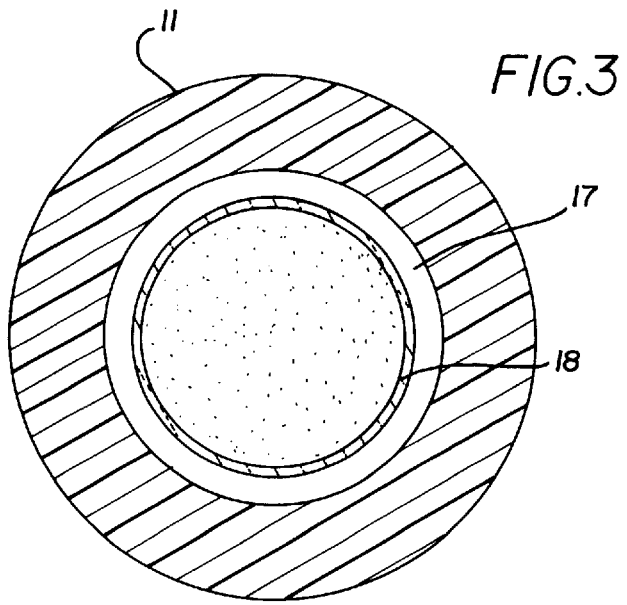
FIG. 3 is a schematic cross sectional view of the outer ring of the present invention.
Figure 4:
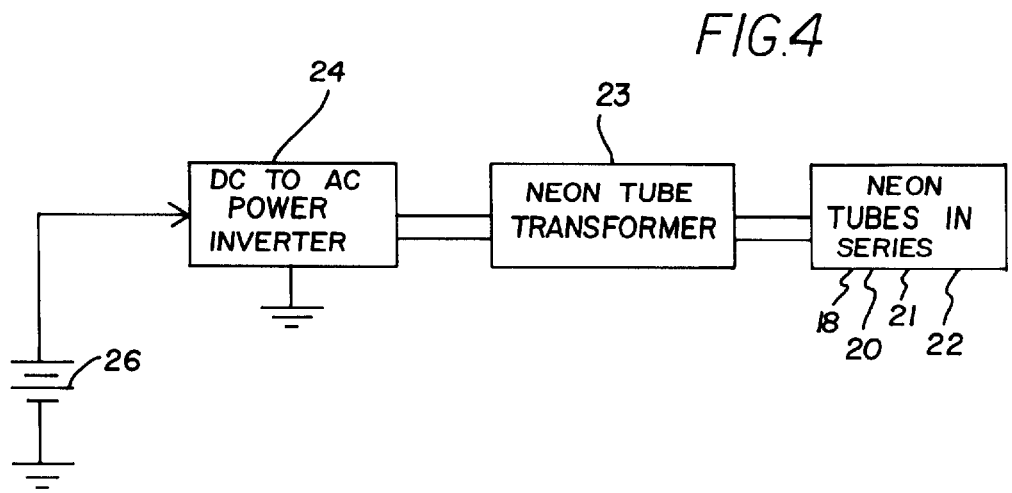
FIG. 4 is a schematic electrical diagram of the present invention.

With reference now to the drawings, and in particular to FIGS. 1 through 4 thereof, a new lighted steering wheel embodying the principles and concepts of the present invention and generally designated by the reference numeral 10 will be described.

As best illustrated in FIGS. 1 through 4, the lighted steering wheel 10 generally comprises an outer ring 11 defining a central space 12 has a center. A hub 13 for mounting to a steering column 28 of a vehicle is located in the central space 12. A plurality of elongate spokes 14,15,16 radially extend between the outer ring 11 and the hub 13 in the central space. The outer ring 11 and the spokes 14,15,16 comprise a translucent material for permitting the passage of light therethrough. An outer light source 18 is provided in the outer ring 11. The outer light source 18 has an elongate portion 20 extending into a first of the spokes 14. A pair of elongate light sources 21,22. One of the elongate light sources 21 is provided in a second of the spokes 15 and another of the elongate light sources 22 is provided in a third of the spokes 16. The outer light source 18 and the elongate light sources 21,22 are electrically connected together.

In closer detail, the outer ring 11 has a circumference and defines a central space 12 with a center. A hub 13 is located in the central space 12 at the center. The hub 13 is generally disk shaped and designed for mounting to a steering column 28 of a vehicle.

A plurality of elongate spokes 14,15,16 radially extend between the outer ring 11 and the hub 13 in the central space 12. Each of the spokes 14,15,16 has a longitudinal axis and a length defined along the associated longitudinal axis. The longitudinal axes of each adjacent pair of spokes 14,15,16 defines an angle therebetween. The spokes 14,15,16 are spaced apart at generally equal intervals around the circumference of the outer ring 11 such that the angles defined between longitudinal axes of adjacent spokes 14,15,16 are generally equal. Ideally, the plurality of spokes 14,15,16 comprises three spokes 14,15,16 so that the angle defined between longitudinal axes of adjacent spokes 14,15,16 is about 120 degrees. Ideally, the lengths of the spokes 14,15, 16 are generally equal to one another. The outer ring 11, the hub 13, and the spokes 14,15,16 generally lying in a common plane. The outer ring 11 and the spokes 14,15,16 comprising a translucent or transparent material for permitting the passage of light therethrough. Ideally, the outer ring 11 and the spokes 14,15,16 comprise a generally rigid translucent plastic or Lexan. The outer ring 11 and the spokes 14,15,16 each are generally tubular and have a lumen 17. The outer ring 11 and the spokes 14,15,16 each have a generally circular transverse cross section defining a transverse diameter. Preferably, the transverse diameters of the outer ring 11 and the spokes 14,15,16 are generally equal.

An outer light source 18 is provided in the lumen of the outer ring 11. The outer light source 18 is generally circular to conform to the shape of the outer ring 11 and has break 19 defining a pair of opposing ends. The opposing ends of the outer light source 18 are positioned adjacent a first of the spokes 14. The outer light source 18 has an elongate portion 20 extending into the lumen of the first spoke 14. Preferably, the elongate portion 20 of the outer light source 18 extends substantially across the length of the first spoke 14. A pair of elongate light sources 21,22 are also provided. One of the elongate light sources 21 is provided in the lumen a second of the spokes 15 while another of the elongate light sources 22 is provided in the lumen of a third of the spokes 16. Each of the elongate light sources 21,22 has a length extending substantially across the length of the associated spoke. Preferably , the outer light source 18 and the elongate light sources 21,22 each have a generally circular transverse cross section defining a transverse diameter. Even more preferably, the transverse diameters of the light sources are generally equal to one another. Ideally, the transverse diameter of each of the elongate light sources 21,22 is between about one-fourth and about three-fourths the transverse diameter of the associated spoke and the transverse diameter of the outer light source 18 is between about one-fourth and about three-fourths the transverse diameter of the outer ring 11.

Preferably, the outer light source 18 and the elongate light sources 21,22 each comprise a neon light tube for providing a neon light illumination when energized. The outer light source 18 and the elongate light sources 21,22 are electrically connected together in series. A transformer 23 is electrically connected to the outer light source 18 and the elongate light sources 21,22. A power inverter 24 for inverting current from DC to AC is electrically connected to the transformer 23,. The transformer 23 and the power inverter 24 are provided in a housing 25 mounted to the back of one of the spokes 14,15,16. The power inverter 24 is designed for electrically connecting to a power source 26 of the vehicle to provide power for illuminating the outer light source 18 and the elongate light sources 21,22. Preferably, a coiled power cord 27 is provided adjacent the housing 25 and is attached to the steering column to electrically connect the power inverter 24 to the power source 26. The coiled power cord permits free turning of the steering wheel. Optionally, a dimmer switch may be electrically connected to the light sources (preferably between the power inverter and the power source) to permit a user to selectively control the brightness of the illuminated light sources.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lighted steering wheel, comprising:
   an outer ring defining a central space having a center;
   a hub for mounting to a steering column of a vehicle being located in said central space;
   a plurality of elongate spokes radially extending between said outer ring and said hub in said central space;
   said outer ring and said spokes comprising a translucent material for permitting the passage of light therethrough;
   an outer light source being provided in said outer ring;
   said outer light source having an elongate portion extending into a first of said spokes;
   a pair of elongate light sources, one of said elongate light sources being provided in a second of said spokes, another of said elongate light sources being provided in a third of said spokes; and
   said outer light source and said elongate light sources being electrically connected together.

2. The lighted steering wheel of claim 1, wherein said hub is generally disk shaped and adapted for mounting to a steering column of a vehicle.

3. The lighted steering wheel of claim 1, wherein said spokes being spaced apart at generally equal intervals around said outer ring.

4. The lighted steering wheel of claim 1, wherein said outer ring and said spokes each have a generally circular transverse cross section defining a transverse diameter, wherein said circular transverse cross sections of said outer ring and said spokes have generally equal transverse diameters.

5. The lighted steering wheel of claim 1, wherein said outer ring, said hub, and said spokes generally lie in a common plane.

6. The lighted steering wheel of claim 4, wherein said outer light source and said elongate light sources each have a generally circular transverse cross section defining a transverse diameter, wherein said transverse diameters of said light sources are generally equal to one another, wherein the transverse diameter of each of said elongate light sources is between about one-fourth and about three-fourths the transverse diameter of the associated spoke, said wherein the transverse diameter of the outer light source is between about one-fourth and about three-fourths the transverse diameter of the outer ring.

7. The lighted steering wheel of claim 1, wherein said outer light source and said elongate light sources each comprise a neon light tube.

8. The lighted steering wheel of claim 1, wherein said outer light source and said elongate light sources are electrically connected together in series.

9. The lighted steering wheel of claim 8, further comprising a transformer being electrically connected to said outer light source and said elongate light sources, a power inverter being electrically connected to said transformer, said transformer and said power inverter being provided in a housing mounted to one of said spokes, said power inverter being adapted for electrically connecting to a power source of the vehicle.

10. An lighted steering wheel, comprising:
    an outer ring having a circumference and defining a central space having a center;
    a hub being located in said central space at said center, said hub being generally disk shaped and adapted for mounting to a steering column of a vehicle;
    a plurality of elongate spokes radially extending between said outer ring and said hub in said central space, each of said spokes having a longitudinal axis and a length defined along the associated longitudinal axis, said longitudinal axes of each adjacent pair of spokes defining an angle therebetween, said spokes being spaced apart at generally equal intervals around said circumference of said outer ring such that said angles defined between longitudinal axes of adjacent spokes are generally equal;
    wherein said plurality of spokes comprises three spokes, said angle defined between longitudinal axes of adjacent spokes is about 120 degrees;
    wherein said lengths of said spokes are generally equal to one another;
    said outer ring and said spokes each being generally tubular and having a lumen, said outer ring and said spokes each having a generally circular transverse cross section defining a transverse diameter, wherein said circular transverse cross sections of said outer ring and said spokes have generally equal transverse diameters;
    said outer ring, said hub, and said spokes generally lying in a common plane;
    said outer ring and said spokes comprising a translucent material for permitting the passage of light therethrough, wherein said outer ring and said spokes comprise a translucent plastic;

an outer light source being provided in said lumen of said outer ring, said outer light source being generally circular and having break defining a pair of opposing ends, said opposing ends of said outer light source being positioned adjacent a first of said spokes;

said outer light source having an elongate portion extending into the lumen of said first spoke, wherein said elongate portion of said outer light source extends substantially across the length of said first spoke;

a pair of elongate light sources, one of said elongate light sources being provided in the lumen a second of said spokes, another of said elongate light sources being provided in the lumen of a third of said spokes, each of said elongate light sources having a length extending substantially across the length of the associated spoke;

wherein said outer light source and said elongate light sources each have a generally circular transverse cross section defining a transverse diameter, wherein said transverse diameters of said light sources are generally equal to one another, wherein the transverse diameter of each of said elongate light sources is between about one-fourth and about three-fourths the transverse diameter of the associated spoke, said wherein the transverse diameter of the outer light source is between about one-fourth and about three-fourths the transverse diameter of the outer ring;

wherein said outer light source and said elongate light sources each comprise a neon light tube;

said outer light source and said elongate light sources being electrically connected together in series;

a transformer being electrically connected to said outer light source and said elongate light sources, a power inverter being electrically connected to said transformer, said transformer and said power inverter being provided in a housing mounted to one of said spokes; and said power inverter being adapted for electrically connecting to a power source of the vehicle.

* * * * *